United States Patent [19]

Yamada

[11] 3,878,858

[45] Apr. 22, 1975

[54] SAFETY DEVICE AUTOMATICALLY ACTUATED BY VIBRATIONS

[76] Inventor: Masafusa Yamada, 10-9; 3-chome, Azumabashi, Sumida-ku, Tokyo, Japan

[22] Filed: Nov. 28, 1973

[21] Appl. No.: 419,863

[30] Foreign Application Priority Data
Nov. 30, 1972 Japan.............................. 47-137180

[52] U.S. Cl........... 137/38; 116/114 D; 200/61.45 R
[51] Int. Cl.............................................. F16k 17/36
[58] Field of Search..................... 137/38, 39, 463; 200/61.45 R, 61.52; 116/114 D

[56] References Cited
UNITED STATES PATENTS
1,712,498    5/1929    Hawxhurst........................... 137/38
2,615,461   10/1952    Crow.................................... 137/39
2,718,899    9/1955    Goddard............................. 137/463

Primary Examiner—Robert G. Nilson
Attorney, Agent, or Firm—Flynn & Frishauf

[57] ABSTRACT

A safety device comprising a weight which is normally secured in place, but readily falls off when subjected to, for example, seismic vibrations; a lock lever rotated by the fall of said weight; a slidable member normally locked by said lock lever but, when released from the locked state by the rotation of said lever, made to slide horizontally in the prescribed direction by the action of a spring associated with the lever, wherein the movement of the slidable member closes valves fitted to a passageway for supplying fluid fuel to various apparatus or shuts off switches disposed in an electric circuit.

5 Claims, 2 Drawing Figures

3,878,858

SAFETY DEVICE AUTOMATICALLY ACTUATED BY VIBRATIONS

BACKGROUND OF THE INVENTION

This invention relates to a safety device automatically actuated when subjected to vibrations and more particularly to a safety device which is automatically operated when subjected to sudden strong vibrations caused by, for example, earthquakes so as to close valves for supplying fluid fuel to various apparatus or shut off electric switches.

Already known are numerous types of safety devices which automatically operate when vigorously shaken so as to shut off passageways of gases or petroleum or electric circuits. However, many of the prior art devices are of complicated arrangement. It has therefore been demanded to develop a novel type of safety device which is of simple construction and which is capable of reliable performance.

SUMMARY OF THE INVENTION

It is accordingly the primary object of this invention to provide a safety device of simple construction, which, when subjected to sharp vibrations, can be automatically actuated to shut off feed-controlling means such as valves and switches fitted to passageways for supplying energy media, for example, liquid or gaseous fuel and electric power.

To attain the above-mentioned objects, the safety device of this invention comprises a weight normally secured in place, but which readily falls off when vigorously shaken; a lock lever rotated by the fall of the weight; and a slidable member normally locked by the lock lever, but when released from the locked state by the rotation of said lever, is made to slide horizontally in the prescribed direction by the action of a spring associated with the lever, all these members being received in a housing.

According to a preferred embodiment, the weight is normally secured at the top of a support pole set up in the housing. The lock lever is normally urged by a spring to rotate in the opposite direction to that in which the lever is made to rotate by the fall of the weight. A lock projection formed on the lock lever engages a stepped lock portion provided on the slidable member so as to firmly lock it. The slidable member is supported in the slide holes bored in both mutually facing side walls of the housing so as to reciprocate lengthwise therethrough, and is normally urged in one horizontal same direction by the action of a spring. The slidable member which is forcefully pushed into place against the action of the spring normally takes such a position as causes the lock projection formed on the lock lever to engage the stepped lock portion of the slidable member.

When the weight falls on to the lock lever by vigorous vibrations resulting from, for example, earthquakes, the lock lever is rotated by the weight against the urging force of the spring and in consequence the lock projection on the lock lever swings out of engagement with the stepped portion of the slidable member to release it from the lock lever. As a result, the slidable member has its position changed from the normal to the abnormal by the action of the spring. This movement of the slidable member shuts off feed-controlling means to prevent an accident which might otherwise occur from, for example, seismic causes.

The weight may take various forms, but a spherical shape is most preferred.

The safety device actuated when subjected to vibrations can be brought back to its normal condition by an externally operable two-armed return lever. When rotated, the return lever pushes backward the slidable member by one of said arms and lifts the fallen weight up to the top of the erected support pole by the other arm. At this time, the lock lever is rotated by the action of the spring to attain engagement between the lock projection on the lock lever and the stepped portion of the slidable member, which now takes a normal position, bringing the safety device as a whole to a normal condition.

DESCRIPTION OF THE PREFERRED EMBODIMENT

Figure 1:
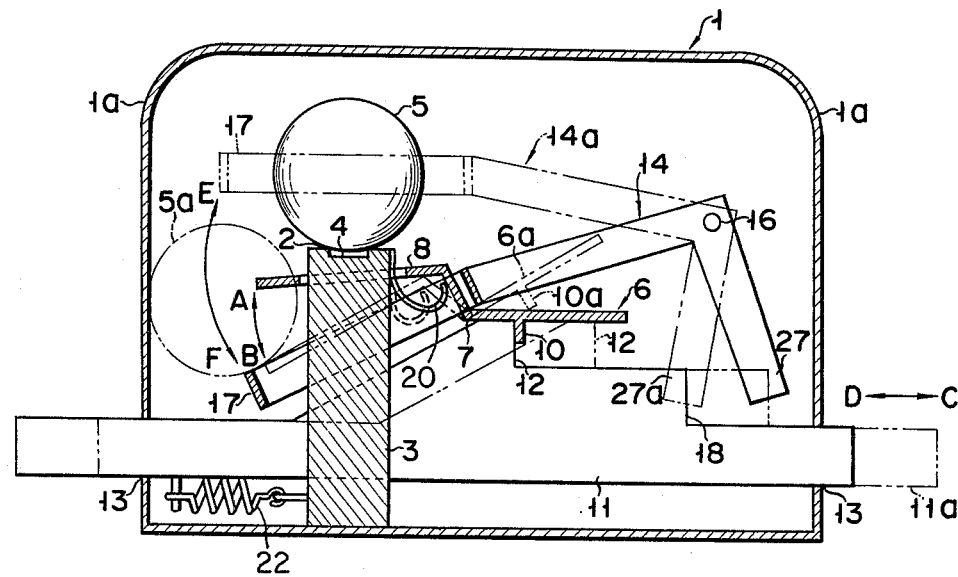
FIG. 1 is a front view, partly in section, of a safety device according to an embodiment of this invention.
Figure 2:
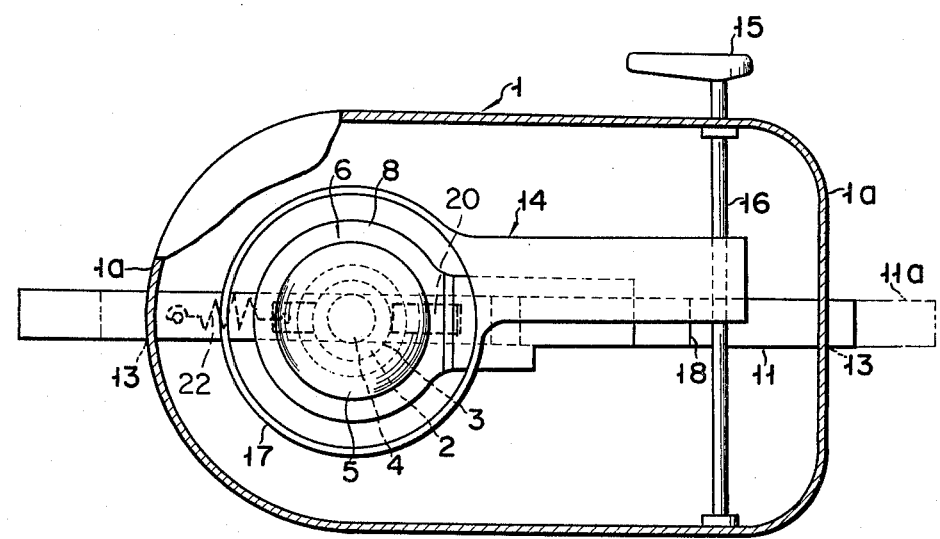
FIG. 2 is a plan view, partly in section, of the safety device of FIG. 1.

Referring to FIGS. 1 and 2, referential numeral 1 denotes a housing which contains a columnar support pole 3, at the top of which there is formed a receptacle 2 having a recess 4 for holding a spherical weight 5. A lock lever 6 is pivotally supported by a shaft 7 substantially at the center, and made rotatable in the directions of the arrows A and B indicated in FIG. 1, and further normally urged in the direction of the arrow A by a spring 20 attached to the support pole 3. In FIG. 1 the spring 20 in the normal position is shown in solid line and the spring 20 in the abnormal position in two-dot chain line. The lock lever 6 has an annular portion 8 formed on one side of the pivotal shaft 7 and a downward extending lock projection 10 disposed on the other side of said shaft 7. The support pole 3 is loosely inserted into the hole of the annular portion 8. The hole is sufficiently large to allow free rotation of the lock lever 6 within a required range.

Disposed below the lock lever 6 is a slidable member 11 which is made slidable in the directions of the indicated arrows C and D with both ends supported in the slide holes 13 bored in the mutually facing side walls 1a of the housing 1. Positioned above the lock lever 6 is a substantially L-shaped return lever 14 which is made rotatable about a shaft 16. The return lever 14 has a sufficiently large annular portion 17 formed at one end and can freely rotate within a required range without striking against the support pole 3 penetrating the hole of the annular portion 8 of the lock lever 6 as well as said annular portion 8. The other end 27 of the return lever 14 engages the slidable member 11.

The slidable member 11 is provided at the center with a projecting section, which, as shown in FIG. 1, initially inclines upward toward the right, is made flat at the top, is thereafter formed into a stepped lock portion 12, and is further provided with a stepped engagement portion 18 on the right side of the above-mentioned projecting section. The slidable member 11 as a whole is normally subjected to the force of a spring 22 attached to the support pole 3 at one end and to the slidable member 11 at the other end and acting in the direction of the indicated arrow C. The spring 22 normally rests in such position as illustrated in FIG. 1, and urges the slidable member 11 to the right in abnormal condition.

Where the safety device is in a normal condition, the spherical weight 5 rests in the recess 4 formed in the top surface of the support pole 3, and the slidable member 11 is set in place by being forcefully pushed in the direction of the indicated arrow D against the force of the spring 22, thereby resting in the position shown by the solid lines in FIG. 1 in engagement with the lock projection 10 of the lock lever 6. The lock lever 6 is so urged by the spring 20 as to rotate about the shaft 7 in the direction of the indicated arrow A and automatically locks the slidable member 11 when it remains in a normal position.

When the safety device kept in the above-mentioned normal condition happens to be vigorously shaken to cause the spherical weight 5 to fall off the recess 4, then the weight 5 rotates the lock lever 6 in the direction of the indicated arrow B against the force of the spring 20 to bring the opposite end portion up to the point 6a. At this time, the weight 5 rests at a point 5a. The inclination of the lock lever 6 and return lever 14 and the semicylindrical left wall of the housing 1 are adapted to enable the spherical weight 5 to roll down to the above-mentioned point 5a. When the opposite end of the lock lever 6 is rotated to the point 6a, then the lock projection 10 is shifted to a point 10a to be disengaged from the stepped portion 12. As a result, the slidable member 11 is pushed in the direction of the indicated arrow C by the force of the spring 22 to reach a point 11a. At this time, the opposite end 27 of the return lever 14 abuts against the stepped engagement portion 18 of the slidable member 11. The movement of the slidable member 11 shuts off the feed-controlling means to prevent the occurrence of any accident.

The return of the safety device of this invention to its normal condition is effected by turning a handle 15 to rotate the return lever 14 fitted to a shaft 16 in the direction of the arrow E indicated in FIG. 1 to bring the left side portion of said lever 14 up to a point 14a. This operation causes the spherical weight 5 resting at the point 5a to be transferred to the annular portion 17 of the return lever 14, lifted up to the top of the support pole 3 and finally secured in the recess 4. The lock lever 6 is rotated by the action of the spring 20 from the point 6a in the direction of the indicated arrow A. The opposite end 27 of the return lever 14 is brought to a point 27a to cause the slidable member to be pushed backward in the direction of the indicated arrow D up to the solid line position. As a result, the lock projection 10 of the lock lever 6 engages the stepped lock portion 12 of the slidable member 11, thereby bringing the safety device to a normal condition. The leftward return of the slidable member 11 puts the shut off feed-controlling means such as valves and switches back to an operable state.

While the invention has been described above with respect to a specific embodiment, it should be clear that various modifications and alterations may be made thereto within the spirit of the inventive concept as defined in the appended claims.

What is claimed is:

1. A safety device automatically actuated by vibrations, comprising:
 a housing having mutually facing side walls;
 a lock lever pivotally received in the housing;
 first urging means coupled to said lock lever for normally urging said lock lever so as to rotate in one direction;
 a lock projection formed on the lock lever;
 a slidable member reciprocally supported on both of said mutually facing side walls in said housing;
 second urging means coupled to said slidable member for normally urging said slidable member so as to move in one direction toward an abnormal position, but which is forcefully movable into place against the force of said second urging means to be engaged with said lock projection and be locked in a normal position and, when released from said lock projection, slides substantially horizontally from the normal to the abnormal position by the force of said second urging means;
 a stepped lock portion formed on said slidable member for engagement with said lock projection to thereby lock said slidable member in said normal position;
 a weight normally secured in a given place and which, when subjected to strong vibrations, falls from said given place onto said lock lever, thereby causing said lock lever to rotate against the force of said first urging means; and
 a two-armed return lever rotatable from outside of the housing, whose rotation causes one of its arms to engage and lift the fallen weight back to the original position prior to its fall and the other arm to abut against and engage said stepped engagement portion of said slidable member to pull it back from its abnormal position and to lock it in said normal position.

2. A safety device according to claim 1 wherein said first urging means comprises a first spring coupled to said lock lever for normally urging said lock lever to rotate in said one direction.

3. A safety device according to claim 1 wherein said second urging means comprises a second spring coupled to said slidable member for normally urging said slidable member for movement in said one direction.

4. A safety device according to claim 1 comprising means for supporting said weight in said given place, said support means comprising a receptacle having a recess therein for receiving said weight, and said given place being above the level of said lever.

5. A safety device according to claim 1 wherein said weight is substantially spherical in form.

* * * * *